United States Patent Office 3,420,632
Patented Jan. 7, 1969

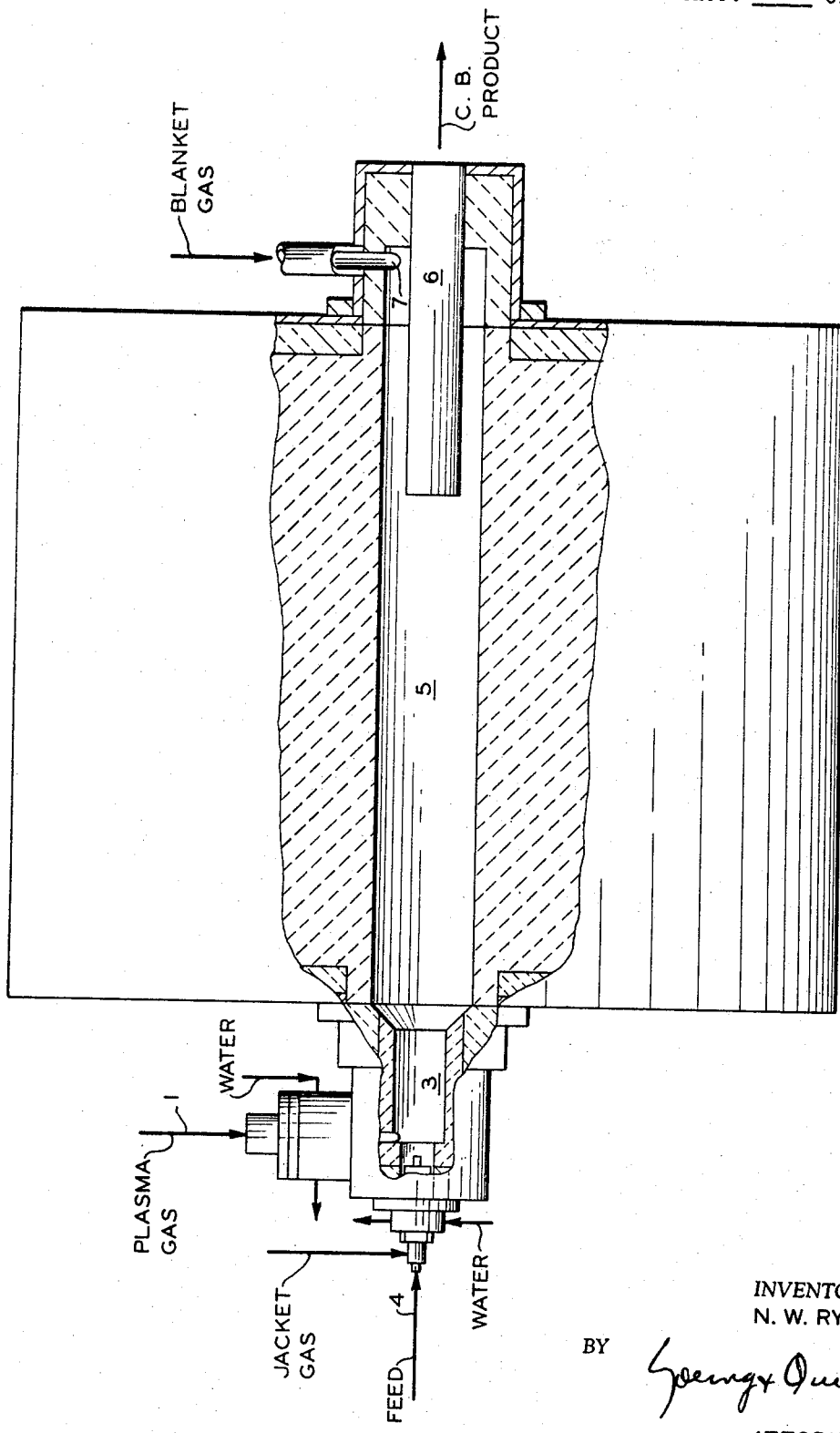

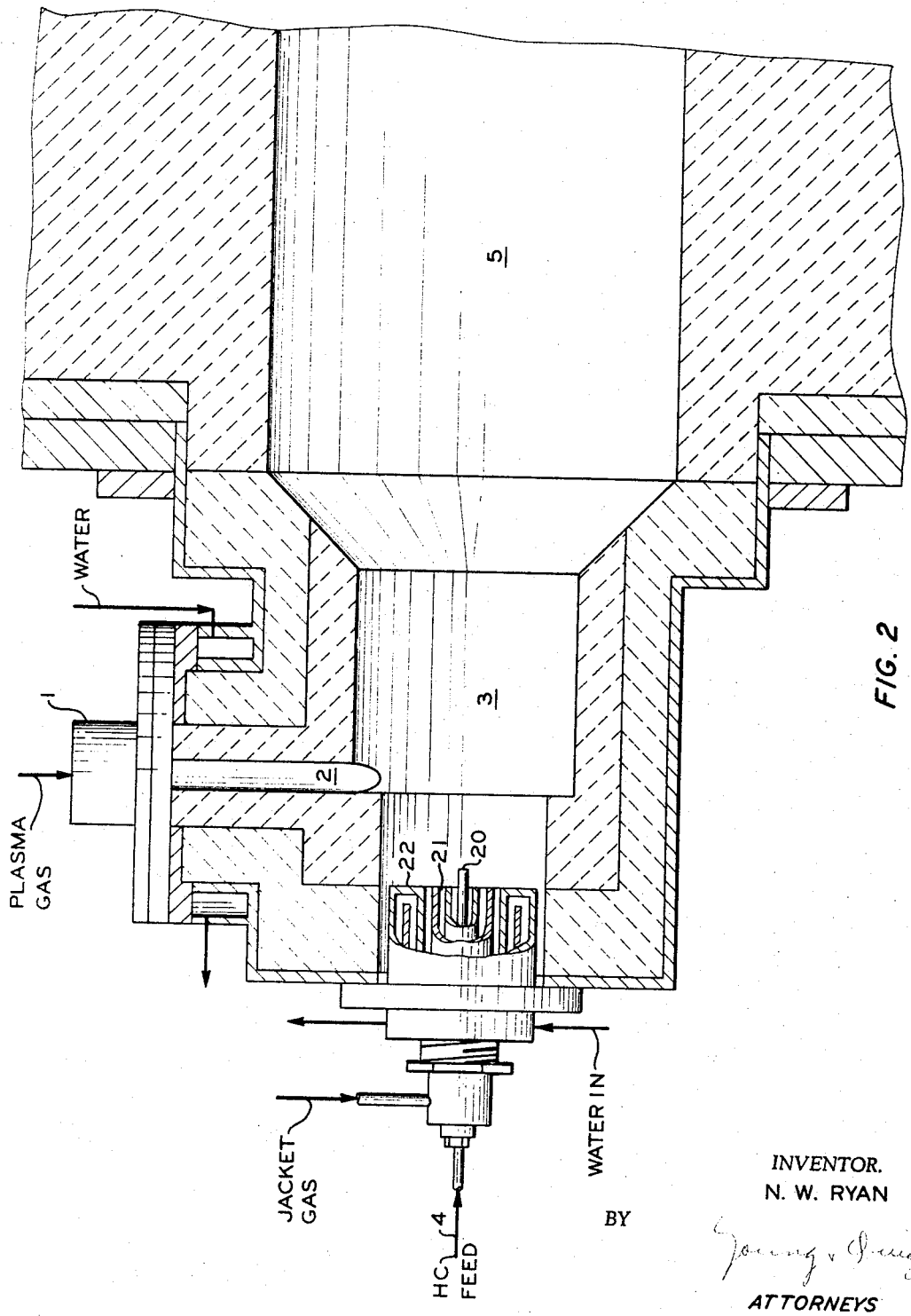

3,420,632
PRODUCTION OF CARBON BLACK USING PLASMA-HEATED NITROGEN
Norman W. Ryan, Salt Lake City, Utah, Assignor to Phillips Petroleum Company, a corporation of Delaware
Filed Nov. 18, 1966, Ser. No. 595,413
U.S. Cl. 23—209.4
Int. Cl. C01b 31/02
6 Claims This invention relates to a method of making high modulus carbon black from plasma-heated nitrogen and aromatic hydrocarbons.

In another aspect, the invention relates to a method of making carbon black in a thermal process by contacting an aromatic hydrocarbon with plasma-heated nitrogen gas wherein at least a portion of the aromatic hydrocarbon is covered with a gas selected from nitrogen, helium, neon, argon, krypton, xenon, air, and mixtures thereof before the contacting occurs, called jacket gas.

In still another aspect, the invention relates to a method of making carbon black by contacting at least one aromatic hydrocarbon with plasma-heated nitrogen gas wherein at least a portion of the aromatic hydrocarbon is covered with a gas selected from air and/or nitrogen, helium, neon, argon, krypton, or xenon, and mixtures thereof, prior to contacting, and wherein a gas such as nitrogen, helium, neon, argon, krypton, or xenon, and mixtures thereof, is introduced downstream of the reaction chamber, moves helically upstream, reverses direction after joining said aromatic hydrocarbon and plasma-heated nitrogen gas and moves downstream therewith.

In another of its aspects, the invention relates to a method of controlling the properties of carbon blacks produced in the above-described process by adjusting the nature and feed rate of the aromatic hydrocarbon, the nature and feed rate of jacket gas used, the feed rate of the plasma-heated nitrogen, the temperature thereof, and the temperature and feed rate of the gas introduced downstream of the reaction chamber.

In the production of carbon black using a plasma stream as the heat source, carbon deposits frequently occur when cracking conditions are severe enough to yield carbon, and the deposition of carbon is sufficiently great in many instances to cause blockage of the reactor. When feed rates are high and heating is inadequate, no carbon black is produced. It is an object of this invention to produce a high structure, high modulus carbon black with high electrical resistivity in high yields with little or no carbon depostion in the reacton chamber.

Another object of the invention is to produce a carbon black by a process in which the reaction zone and wall surfaces of the carbon black reactor are separated.

Another object is to make a high structure, high modulus carbon black having high electrical resistivity.

Another object is to protect the walls of the reactor.

Other aspects, objects, and the several advantages of the invention will be apparent to one skilled in the art upon a reading of the specification, claims, and the appended drawings.

In accordance with the practice of this invention, a method of making carbon black is provided which comprises contacting at least one aromatic hydrocarbon with plasma-heated nitrogen which is at a temperature sufficiently high to promote formation of carbon black wherein at least a portion of the aromatic hydrocarbon is covered with a gas selected from air and/or nitrogen, helium, neon, argon, krypton, or xenon, and mixtures thereof, before said contacting occurs, and wherein a gas, such as helium, neon, argon, krypton, and/or xenon, is introduced downstream of the reaction chamber, moves helically upstream, reverses direction after joining the aromatic hydrocarbon and plasma-heated nitrogen gas, and moves downstream therewith. This carbon black manufacturing process provides effective separation of the reaction zone and wall surfaces in the reactor, and thus substantially eliminates deposition of carbon in the reactor.

The feedstock used in the practice of this invention comprises at least one aromatic hydrocarbon. Said hydrocarbon can be mono- or polycyclic, and can contain one or more hydrocarbon substituents thereon. Some examples are:

Benzene
Toluene
Metaxylene
Orthoxylene
Paraxylene
Naphthalene
Anthracene
1,2,3-trimethylbenzene
1,2,4-trimethylbenzene
1,3,5-trimethylbenzene
1,2,3,4-tetramethylbenzene Ethylbenzene
n-Propylbenzene
Isopropylbenzene
n-Butylbenzene
4-isopropyltoluene
1,3,5-triethylbenzene
2,4-dimethylnaphthalene
1,8-diethylnaphthalene
9,10-dimethylanthracene and the like. Mixtures of these compounds can also be used.

The jacket gas used to cover at least a portion of the aromatic feedstock minimizes carbon deposition in the reaction chamber. Air and/or nitrogen, helium, neon, argon, krypton, and xenon can be used. Generally, the quantity of jacket gas fed is dependent upon the rate of flow of the aromatic hydrocarbon feed. As the aromatic hydrocarbon feed rate is increased, the quantity of jacket gas can be substantially reduced.

The gas introduced downstream of the reaction chamber, designated as blanket gas, will be nitrogen, helium, neon, argon, krypton, or xenon, or mixtures thereof. The feed rate of this gas preferably exceeds the flow of plasma gas. Through separation of the reactor walls from the reaction zone by the blanket gas, the reaction zone will remain substantially free from carbon deposits.

Generally, the flow rates of the aromatic hydrocarbon feedstock, jacket gas, blanket gas, and plasma-heated nitrogen are coordinated so as to prevent carbon deposition in the reactor. For example, when using the apparatus described with reference to FIGURE 1 herein below, the aromatic hydrocarbon feed rate should be within the range of from about 2 to about 45 pounds per hour or more; the jacket gas feed rate within the range of from about 60 to about 170 standard cubic feet per hour or more; the feed rate of plasma-heated nitrogen within the range from about 500 to about 3000 standard cubic feet per hour or more; and the feed rate of blanket nitrogen generally within the range of from about 900 to about 3000 standard cubic feet per hour, preferably at least 2000 standard cubic feet per hour.

Plasma flame generators and plasma stream-producing devices are known in the art, and do not form a part of the invention other than in the use of plasma-heated nitrogen to effect formation of carbon black as described herein. Thus, any plasma stream apparatus known in the art can be utilized in the invention so long as the apparatus produces a high temperature plasma stream from nitrogen gas to effect conversion of the aromatic feedstock contacted therewith as set forth herein. Suitable plasma flame generators that can be used are disclosed in U.S. 2,960,594, Thorpe, issued Nov. 15, 1960, and U.S. 2,922,869, Giannini et al., issued Jan. 26, 1960. The plasma stream used can be defined as consisting of neutral gas, ions, and electrons of nitrogen at high temperature, and can be produced by passing nitrogen gas through an arc produced by high density current between two suitable electrodes. Such a plasma arc torch is capable of obtaining temperatures in the range of 5000 to 30,000° F., though, for the practice of this invention, temperatures of at least 5000° F. and, preferably, at least 6000° F. are employed. It is also preferred to vaporize and heat the aromatic hydrocarbon feedstock to a temperature in excess of 300° F. prior to introducing the feedstock to the contacting step of the process.

The drawings represent a diagram of a reactor suitable for preparing a carbon black according to the process of this invention. FIGURE 1 is a diagram of a reactor which has been used to make carbon black by the process of this invention, but it should be understood that various other embodiments are also within the scope of the invention.

Referring now to FIGURE 1, in which the dimensions given hereinbelow are those of the reactor described in the specific example, a plasma generator 1, powered by any known and suitable power source, and operating on nitrogen as the plasma-forming gas, supplies the plasma-heated gas through a 0.75 inch diameter tangential opening at the upstream end of mixing chamber 3. The reactor used comprises a graphite and zirconia mixing section 3, which is 2 inches in diameter and 4 inches long, into which plasma heated gas enters tangential to the flow of feedstock from chamber 2 to chamber 3 (FIGURE 2). Heated feedstock is introduced axially at 4, the upstream end of the mixing chamber.

FIGURE 2 represents a detailed diagram of inlet means 4 for introduction of the aromatic hydrocarbon feedstock and jacket gas. The heated feedstock is introduced via tube 20 and the jacket gas is introduced through annulus 21 around the feed tube. Surrounding annulus 21 is water cooling means 22. Dead air spaces are provided between the tubes. While water cooling means is not mandatory in all types of operations, it is generally preferred, particularly in the smaller types of furnaces. The diameter of the feed inlet, which is selected to provide a feed rate in the range desired, is preferably within the range of from about 0.085 to 0.159 inch. The feed tube inlet extends 0.125 inch downstream of the zirconia-graphite juncture of the mixing chamber and the remainder of the feed tube assembly is positioned flush with the zirconia-graphite juncture of the mixing chamber.

The reactor is tapered, at an included angle of 90°, out to a diameter of 6 inches. Reaction section 5 consists of an alumina tube 6 inches in diameter and 24 inches long. Referring again to FIGURE 1, extending 9 inches into the downstream end of the reaction section is a 2-inch inside diameter by 2.5-inch outside diameter silicon carbide exit tube 6. A tangential opening 0.5 inch in diameter is provided at 7 for introduction of nitrogen gas employed to cover the walls of the reaction section. The outside diameter of the refractory insulation around the reaction section is 30 inches.

In operation, the blanket gas is introduced at the downstream end of the reaction section, travels upstream in a helical path along the reactor wall, and joins the reaction stream consisting of the aromatic hydrocarbon feed, jacket gas, and plasma-heated nitrogen gas. The flow of blanket gas reverses direction when it joins the reaction stream and then travels downstream, leaving the reaction section through silicon carbide tube 6.

The carbon black produced in the apparatus described with reference to FIGURE 1 is a high structure, high modulus black that is essentially tar free and has high electrical resistivity resembling that of furnace carbon blacks. By proper control of reaction variables, the surface area and hydrogen content of the carbon black can be varied over a considerable range. Carbon blacks prepared according to the process of this invention are better reinforcing agents for rubber than many of the carbon blacks prepared by other plasma-type operations.

The materials of construction used to make the apparatus must be capable of withstanding the high temperatures employed in the process of this invention. Such resistant materials are known. High refractory oxides and graphite can be used. The reaction chamber can be made of alumina, alumina-silica mixtures, zirconia, etc.

EXAMPLE I

Carbon black was prepared from benzene in a thermal process using plasma-heated nitrogen provided by a modified Plasmadyne SG-1 gun. Two runs were conducted using the furnace of FIGURE 1. The benzene feed was vaporized and heated to 380° F. before introduction into the reactor. Jacket nitrogen was used around the feed. The benzene feed rate and flow of jacket nitrogen were essentially the same in the two runs. Cool nitrogen gas was introduced at the downstream end of the reaction section to cover the reactor walls. Two cyclones were placed in series following the reactor, one to serve as a grit separator and the other for collecting the black. In the first run the reactor walls remained clean except for a small amount of loose deposit in about the first 10 inches of the 6-inch diameter section. In the second run a very thin deposit formed in about the first 10 inches of the reactor section and the rest remained clean.

A control run was made in which carbon black was prepared from benzene in a thermal process using plasma-heated nitrogen provided by a modified Plasmadyne SG-1 gun, as in runs 1 and 2. The upstream end of the reactor was the same as that in FIGURE 1. Jacket nitrogen was used around the benzene feed. The benzene was vaporized and heated to 370° F. before introduction into the reactor. The reaction section was an alumina tube 6 inches in diameter and 24 inches long. It was followed by a quench section which was 4 inches in diameter and 13 inches long. There was no quench section in FIGURE 1 as the nitrogen introduced at 7 provided the necessary cooling means. In this run a small amount of a light, fluffy deposit appeared on the walls of the 6-inch reaction section.

Data on the three runs and properties of the carbon black are presented in Table I. Conditions were comparable in runs 1 and 3 except that blanket nitrogen was introduced at the downstream end of the reactor in run 1 and a nitrogen quench was used in run 3. In run 2, made according to the invention, the flow of blanket nitrogen was increased, the surface area decreased, and the oil absorption was slightly higher than in run 1. This carbon black had a higher hydrogen content than products from the other runs.

TABLE I

| Run | 1 | 2 | 3 |
|---|---|---|---|
| Plasma N$_2$: | | | |
| S.c.f.h. | 766 | 744 | 766 |
| Net kw. | 58 | 58 | 57 |
| Temperature, ° F.[1] | 8,730 | 8,920 | 8,640 |
| Benzene feed: | | | |
| Lb./hr. | 22.1 | 21.9 | 21.5 |
| Temperature, ° F. | 380 | 380 | 370 |
| Feed tube diameter, in. | 0.105 | 0.105 | 0.105 |
| Jacket N$_2$ (around feed), s.c.f.h. | 155 | 158 | 153 |
| Jacket gas annulus, in. | 0.305/0.125 | 0.305/0.125 | 0.305/0.125 |
| Blanket N$_2$ (introduced downstream, cool), s.c.f.h. | 912 | 2,180 | |
| Quench N$_2$, s.c.f.h. | | | 900 |
| Yield, percent C in feed. | 90.5 | 86 | 98.4 |
| Photelometer [2] | 100 | 83 | 100 |
| Oil absorption, cc./g.[3] | 1.64 | 1.76 | 1.91 |
| Nitrogen surface area, m.$^2$/g.[4] | 115 | 85 | 116 |
| pH | ([5]) | 8.8 | 9.4 |
| Hydrogen, wt. percent. | 0.13 | 0.25 | 0.06 |

[1] At exit from plasma gun.
[2] ASTM D1618–58T.
[3] ASTM D281–31.
[4] The method using the Brunauer, Emmett, and Teller Theory (B.E.T. Method) involving the low temperature adsorption of a monomolecular layer of nitrogen.
[5] Not determined.

The carbon blacks from runs 2 and 3, together with a high abrasion furnace black (Philblack O) and an intermediate super abrasion furnace black (Philblack I), were evaluated in a butadiene/styrene rubber. The following compounding recipe was used:

| | Parts by wt. |
|---|---|
| Butadiene/styrene rubber (SBR 1006)[1] | 100 |
| Carbon black | 40 |
| Zinc oxide | 3 |
| Aromatic oil (Philrich 5) | 6 |
| Sulfur | 1.75 |
| Santocure[2] | 0.9 |

[1] ASTM D1419–61T, recipe for type 1006.
[2] N-cyclohexyl-2-benzothiazolesulfenamide.

The compounded stocks were cured 30 minutes at 307° F. and physical properties determined. Results were as follows:

| | Carbon black from run— | | Philblack I | Philblack O |
|---|---|---|---|---|
| | 2 | 3 | | |
| $\nu \times 10^4$, moles/cc.[1] | 1.78 | 1.70 | 1.49 | 1.49 |
| 300% modulus, p.s.i. | 1,895 | 1,350 | 1,205 | 1,275 |
| Tensile, p.s.i. | 3,260 | 3,060 | 3,810 | 3,425 |
| Elongation, percent | 430 | 510 | 590 | 555 |
| $\Delta T$, °F. | 64.3 | 68.4 | 68.9 | 64 |
| Resilience, percent | 64.2 | 60.8 | 61.4 | 64.2 |
| Shore A hardness | 60 | 60 | 58.5 | 57.5 |
| Electrical resistivity, ohm-cm. | $3.45 \times 10^9$ | 10.20 | 153 | $8.0 \times 10^3$ |

[1] Number of network chains per unit volume of rubber, determined by the swelling method of Kraus, Rubber World 135, 67–73, 254–260 (1956).

Physical properties of the two furnace carbon blacks were as follows:

| | Philblack I | Philblack O |
|---|---|---|
| Oil absorption, cc./g. | 1.23 | 1.13 |
| Nitrogen surface area, m.²/g. | 112 | 81 |
| pH | 8.3 | 8.4 |
| Hydrogen, wt. percent | 0.27 | 0.29 |

The data show that the carbon black from run 2, prepared according to the invention, gave a high modulus rubber whereas that from run 3, and also the two furnace carbon blacks, gave a much lower modulus rubber. The carbon black from run 2 had a much higher electrical resistivity from that prepared in run 3 or the furnace carbon blacks.

Net kw. in Table I is the total power available minus heat loss to cooling water from plasma gun.

The weight percent hydrogen is based on the weight of dry carbon black.

Modulus, tensile strength, and elongation were determined according to ASTM D412–62T.

$\Delta T$, °F. (heat build-up) was determined according to ASTM D623–62, Method A.

Resilience was determined according to ASTM D945–59 (modified). A Yerzley oscillograph was used and the test specimen was a right circular cylinder 0.7 inch in diameter and one inch high.

Shore A hardness was determined according to ASTM D1706–61.

Electrical resistivity was determined by packing a sample of carbon black to a definite density in a tube of uniform bore and measuring the resistivity in ohm-cm.

Reasonable modification and variation are possible within the spirit and scope of the invention, the essence of which is a method of making carbon black by contacting at least one aromatic hydrocarbon with plasma-heated nitrogen which is at a temperature sufficiently high to promote formation of carbon black wherein at least a portion of said aromatic hydrocarbon is covered with gas selected from nitrogen, helium, neon, argon, krypton, xenon, and/or air before said contacting occurs, and wherein a gas such as nitrogen is introduced downstream of the reaction chamber, moves helically upstream, reverses direction after joining said aromatic hydrocarbon and plasma-heated nitrogen gas and moves downstream therewith.

I claim:

1. A method of making carbon black comprising contacting at least one aromatic hydrocarbon with plasma-heated nitrogen, said nitrogen being at a temperature sufficiently high to promote formation of carbon black, wherein at least a portion of said aromatic hydrocarbon is covered with gas selected from nitrogen, helium, neon, argon, krypton, xenon, air, and mixtures thereof, before said contacting occurs and wherein a gas selected from nitrogen, helium, neon, argon, krypton, and xenon, and mixtures thereof is introduced helically upstream, reverses direction after joining said aromatic hydrocarbon and said plasma-heated nitrogen gas, and moves downstream therewith.

2. A method as defined in claim 1 wherein the temperature of said plasma-heated nitrogen is at least 5000° F.

3. A method as defined in claim 1 wherein said aromatic hydrocarbon is heated to a temperature of at least 300° F. prior to said contacting.

4. A method as defined in claim 1 wherein said aromatic hydrocarbon is benzene.

5. A method as defined in claim 1 wherein said plasma-heated nitrogen is contacted with said aromatic hydrocarbon tangential to the flow thereof.

6. A method as defined in claim 1 wherein said aromatic hydrocarbon is fed to the reaction zone at a rate of from about 2 to about 45 pounds per hour, the gas selected from nitrogen, air, helium, neon, argon, krypton, xenon, and mixtures thereof is fed to the reaction zone at a rate of from about 60 to about 170 standard cubic feet per hour, said plasma-heated nitrogen is fed to the reaction zone at a rate of from about 500 to about 3000 standard cubic feet per hour, and said nitrogen is introduced downstream at a rate of from about 900 to about 3000 standard cubic feet per hour.

References Cited

UNITED STATES PATENTS

| 2,121,463 | 6/1938 | Wisdom | 23—209.4 |
| 3,009,783 | 11/1961 | Sheer et al. | 23—209.3 |
| 3,288,696 | 11/1966 | Orbach | 204—173 |
| 3,342,554 | 9/1967 | Jordan et al. | 23—209.2 |
| 3,344,051 | 9/1967 | Latham | 204—173 |

EDWARD J. MEROS, *Primary Examiner.*

U.S. Cl. X.R.

23—209.3, 259.5; 204—173